(12) United States Patent
Li et al.

(10) Patent No.: US 8,530,043 B2
(45) Date of Patent: Sep. 10, 2013

(54) COMPOSITE LAMINATE COMPOSITION

(75) Inventors: Dean Li, Dover, OH (US); Dongbiao Wang, Canton, OH (US)

(73) Assignee: Boltaron Performance Products, L.L.C., Newcomerstown, OH (US)

( * ) Notice: Subject to any disclaimer, the term of this patent is extended or adjusted under 35 U.S.C. 154(b) by 238 days.

(21) Appl. No.: 13/000,037

(22) PCT Filed: Jun. 25, 2009

(86) PCT No.: PCT/US2009/048619
§ 371 (c)(1),
(2), (4) Date: May 17, 2011

(87) PCT Pub. No.: WO2009/158475
PCT Pub. Date: Dec. 30, 2009

(65) Prior Publication Data
US 2011/0223400 A1   Sep. 15, 2011

Related U.S. Application Data

(60) Provisional application No. 61/075,428, filed on Jun. 25, 2008.

(51) Int. Cl.
*B32B 7/02* (2006.01)
*B32B 27/36* (2006.01)

(52) U.S. Cl.
USPC .......................................... 428/215; 428/412

(58) Field of Classification Search
None
See application file for complete search history.

(56) References Cited

U.S. PATENT DOCUMENTS

| 5,304,413 A | 4/1994 | Bloom et al. |
| 2005/0182167 A1* | 8/2005 | Goodson et al. ............... 524/115 |

FOREIGN PATENT DOCUMENTS

| JP | 06-025436 | 2/1994 |
| JP | 07-223298 | 8/1995 |
| JP | 10-219634 | 8/1998 |
| JP | 10-227103 | 8/1998 |
| JP | 2005-037590 | 2/2005 |
| JP | 2005-037591 | 2/2005 |

* cited by examiner

*Primary Examiner* — Sheeba Ahmed
(74) *Attorney, Agent, or Firm* — Daniel J. Schlue; Black, McCuskey, Souers & Arbaugh, L.P.A.

(57) ABSTRACT

A multi-layer composite laminate composition having a substrate layer and an overlay layer that are both bonded to at least one adjacent layer in a multi-layer composite laminate composition; the substrate layer being a thermoformable material having a material formulation that includes a polycarbonate homopolymer or copolymer; the overlay layer being a thermoformable material having a material formulation that includes an ingredient selected from the group consisting of PVC, PVC alloy, acrylic, polyurethane, acrylonitrile butadiene styrene, and combinations thereof.

10 Claims, No Drawings

COMPOSITE LAMINATE COMPOSITION

CROSS-REFERENCE TO RELATED APPLICATIONS

This application claims priority of U.S. Provisional Patent Application No. 61/075,428 filed on Jun. 25, 2008. The subject matter of U.S. Provisional Patent Application No. 61/075,428 filed on Jun. 25, 2008 is hereby incorporated by reference.

BRIEF SUMMARY OF THE INVENTION

Generally provided is a multi-layer composite laminate composition having a substrate layer and an overlay layer that are both bonded to at least one adjacent layer in a multi-layer composite laminate composition; the substrate layer being a thermoformable material having a material formulation that includes a polycarbonate homopolymer or copolymer; the overlay layer being a thermoformable material having a material formulation that includes an ingredient selected from the group consisting of PVC, PVC alloy, acrylic, polyurethane, acrylonitrile butadiene styrene, and combinations thereof; the multi-layer composite laminate composition having the following performance characteristics: i) flammability: the composite laminate being compliant with FAR 25-853(a)(1)(i) 60-second vertical burn, wherein 60-second vertical burn average burn length does not exceed 6 inches, average after flame time does not exceed 15 seconds and average after flame drip time does not exceed 3 seconds; ii) flammability: the composite laminate being compliant with FAR 25-853 (a)(1)(ii) of 12-second vertical burn, wherein 12-second vertical burn average burn length does not exceed 8 inches, average after flame time does not exceed 15 seconds and average after-flame drip time does not exceed 5 seconds; specific optical smoke density: using an NBS smoke chamber, the average peak smoke density within 4-minute is equal to or less than 200 as regulated by FAR 25-853(d); iv) specific optical smoke density: using an NBS smoke chamber, the average peak composite-material smoke density within 4-minute is equal to or less than 150 as regulated by airbus ABD0031/ATS1000; v) toxicity of burning gas: composite-material smoke extracted from NBS smoke chamber and measured by Draeger tube has an average concentration (in parts per million, ppm) of the following gas components: HF<100 ppm, HCl<150 ppm, HCN<150 ppm, SO2/H2S<100 ppm, NO/NO2<100 ppm, and CO<1000 ppm; vi) heat release and heat release rate: as measured by OSU heat release tester, the total 2-minute heat release and heat release rate does not exceed 65 KW-min/m2 and 65 KW/m2, respectively regulated by FAR 25-853(d).

DETAILED DESCRIPTION OF THE INVENTION

Generally provided is a composite laminate composition that is made up of two or more united or bonded layers of distinct materials. Manufacturing the composite laminate composition can generally be understood to include the general step of bonding or uniting two or more layers or sheets of distinct materials into a single composite structure.

TWO-LAYER COMPOSITE LAMINATE

An embodiment provides for the composite laminate composition having two layers of distinct materials—a first layer and a second layer. In a two-layer composite-structure embodiment, the first layer will be referred to as the substrate layer and the second layer will be referred to as the overlay.

Embodiments provide for the substrate layer being a polycarbonate or a polycarbonate-polyester copolymer that is fully compliant with governmental regulations generally directed to flammability, smoke, toxicity, and heat-release (FSTH) test-performance characteristics. An embodiment provides for the substrate being manufactured from a poly (oxycarbonyloxy-1,4-phenylene-isopropylidine) polycarbonate homopolymer or copolymer.

Non-limiting examples of useful polycarbonate-polyester copolymers that are FSTH compliant include polycarbonate-polyester copolymers currently sold by SABIC Innovative Plastics under the trademarks LEXAN XHR 6000 and LEXAN FST 9705. US trademark registration number 0902420 for the wordmark LEXAN is associated with goods and services described as "Polycarbonate resin sheet material and molding compound." Trademark registration number 0902420 is currently owned by Sabic Innovative Plastics IP B.V. Company Netherlands Plasticslaan 1 4612 PX Bergen Op Zoom Netherlands.

Furthermore, in a two-layer composite laminate embodiment, the first-layer polycarbonate homopolymer or copolymer substrate can have any thickness, and based upon the target application, persons of ordinary skill in the art will be able to select useful substrate thicknesses without having to exercise undue experimentation. As a nonlimiting example of useful substrate thicknesses, the substrate can have a thickness ranging from about 0.1-10 mm, 0.5-6 mm, or 1-3 mm.

In combination with the substrate thickness characteristics described above, the first-layer polycarbonate homopolymer or copolymer substrate can be a sheet of material having an area that is not limited to any particular length or width dimensions. With both end-use and manufacturing process requirements in mind, persons of ordinary skill in the art will be able to select useful length and width dimensions without having to exercise undue experimentation.

Polycarbonate homopolymer or copolymer sheets that are useful for manufacturing the substrate layer of a composite laminate can be purchased commercially or manufactured from a raw material or commercial sheet to meet specific length, width, or thickness requirements. As a non-limiting example, conventional sheet extrusion techniques can be used to manufacture the polycarbonate homopolymer or copolymer substrate. As another non-limiting example, persons of ordinary skill in the art will be able to manufacture the first-layer polycarbonate homopolymer or copolymer substrate using a single-screw extruder with die, roll stack and pulling unit.

In a two-layer composite laminate structure, the overlay layer can be any polymeric material having any surface texture or aesthetic characteristic, and there are no limitations directed to the materials that can be used in manufacturing the second or top layer. Non-limiting examples of useful textures and colors include metallic colors, wood-grain, pearlescent, and carbon-fiber surfaces, finishes, or faux surfaces. Non-limiting examples of useful second or top-layer materials include PVC, PVC alloy, acrylic, polyurethane, acrylonitrile butadiene styrene (ABS), and combinations thereof. Embodiments also provide for formulating the overlay with a flame retardant, and particular embodiments are directed to a flame retardant having a metal hydrate, a halogen, or a combination of both a metal hydrate and a halogen. Commercial flame retardants are readily available, and persons of ordinary skill in the art will be able to select useful flame retardants without having to exercise under experimentation. Based upon the desired visual and performance characteristics of the two-layer composite laminate, persons of ordinary skill in the art will be able to select useful overlay materials and formulations without having to exercise undue experimentation.

The overlay layer can have any thickness, and based upon the composite-laminate target application, persons of ordinary skill in the art will be able to select useful thicknesses without having to exercise undue experimentation. As a non-limiting example of useful overlay thicknesses, the overlay can have a thickness ranging from about 0.05 to 5.00 mm, 0.05 to 3.00 mm, or 0.05 to 1.00 mm.

In combination with the overlay thickness characteristics described above, the overlay can be a sheet or film of material having an area that is not limited to any particular length or width dimensions. With both end-use and manufacturing process requirements in mind, persons of ordinary skill in the art will be able to select useful overlay length and width dimensions without having to exercise undue experimentation.

Thin-sheet and film materials useful for manufacturing the overlay can be purchased commercially, and the thin-sheet and film overlay materials can also be manufactured from a resin formulation or commercially available sheet of material by using conventional methods that include direct film extrusion, blown film extrusion, sheet calendering, or combinations thereof.

Manufacturing embodiments for a two-layer composite laminate provide for the substrate and overlay to be united or bonded by using material diffusion and chemical action that result from applying heat, pressure, or both to the two stacked layers over a period of time. As a non-limiting example, useful heats for bonding the substrate and overlay include heats ranging from 200-400° F., and persons of ordinary skill in the art will be able to select useful temperatures without having to exercise undue experimentation.

As a non-limiting example of useful pressures for bonding the substrate and overlay, useful pressures can range from 600 to 2000 pounds per square inch, and persons of ordinary skill in the art will be able to select useful pressures without having exercise undue experimentation.

As a nonlimiting example, a useful combination of heat and pressure over a period of time include: 5-10 hours under a temperature ranging from about 200-400° F. and a pressure ranging from about 600-2000 pounds per square inch. In order to apply heat and pressure over a period of time, non-limiting examples of useful manufacturing apparatuses include a film-calendering line, a thermal press, or a combination thereof.

THREE-LAYER COMPOSITE LAMINATE THAT INCLUDES AN ADHESIVE LAYER

As a supplement or alternative to using heat, pressure, and time to unite or bond the substrate layer to the overlay layer, a layer of one or more adhesives may be between the substrate and overlay. Because the adhesive layer is positioned between the substrate and the overlay, the resulting composite structure (with the adhesive) is made up of three layers—i) the polycarbonate homopolymer or copolymer substrate; ii) an adhesive layer; and iii) an overlay.

In this three-layer composite laminate embodiment, useful materials and characteristic dimensions of the substrate and overlay are the same as in the two-layer composite laminate embodiments.

Also in this three-layer composite laminate embodiment, which has an adhesive middle layer, the adhesive middle layer can be manufactured using any known adhesive, and there are no limitations directed to the combinations of adhesives that can be used in manufacturing the middle layer. Non-limiting examples of useful adhesives include acrylic adhesives, polyurethane adhesives, and combinations thereof. Persons of ordinary skill in the art will be able to select useful middle-layer adhesives without having to exercise undue experimentation.

In this three-layer composite laminate embodiment, the adhesive middle layer can be of any thickness, and persons of ordinary skill in the art will be able to select useful middle-layer thicknesses without having to exercise undue experimentation. As a non-limiting example, the middle layer can have a thickness ranging from about 0.01 mm to 0.2 mm, 0.05 to 1 mm, or 0.1 to 1 mm.

Because this three-layer composite laminate that has an adhesive layer, uses an adhesive between the substrate layer and overlay layer, embodiments for manufacturing the three-layer composite laminate may or may not involve applying heat and pressure to the stacked three layers over a period of time. Whether heat and pressure are used in manufacturing a three-layer composite laminate will depend on the performance and activation characteristics of the adhesive middle layer. If the adhesive middle layer is heat or pressure activated, then naturally heat or pressure will need to be applied during the manufacturing process. But if the adhesive middle layer requires neither heat nor pressure for activation, then neither heat nor pressure may need to be applied to the composite structure during the manufacturing process. Persons of ordinary skill in the art will be able to determine, based on the type of adhesive or combination of adhesives forming the middle layer, whether heat, pressure, or both are required in order to bond or unite all three layers into a single composite structure. Furthermore, if heat, pressure, or both are required in order to bond or unite all three layers into a single composite structure, persons of ordinary skill in the art will be able to determine the necessary amount of pressure, heat, or both to be applied during the manufacturing process without having to exercise undue experimentation.

Manufacturing embodiments for a three-layer composite laminate that have an adhesive middle layer provide for the substrate and overlay to be bonded via an adhesive middle layer. In addition to bonding the substrate layer to the overlay layer via the adhesive middle layer, additional bonding may occur due to applying heat, pressure, or both to the stacked layers over a period of time. Application of heat, pressure, or both may result in material diffusion, chemical action, or both. As a nonlimiting example, useful heats for bonding the substrate and overlay in this three-linear embodiment include heats ranging from about room temperature to 400° F.

As a non-limiting example of useful pressures for bonding this three-layer composite laminate layers, useful pressures can range from about 600 to 2000 pounds per square inch:

Useful combinations of heat and pressure that can be applied over a period of time include 5-10 hours under a temperature ranging from 200-400° F. in a pressure ranging from about 600-2000 pounds per square inch.

In order to apply heat and pressure over a period of time during the manufacture of a three-layer composite laminate embodiment, non-limiting examples of useful manufacturing apparatuses include a film-calendaring line, a thermal press, or a combination thereof.

THREE-LAYER COMPOSITE LAMINATE WITHOUT AN ADHESIVE LAYER

An additional three-layer composite laminate embodiment is made up of i) a polycarbonate homopolymer or copolymer substrate; an overlay; and iii) a protective layer. In this particular three-layer embodiment, there is no adhesive layer.

In this three-layer composite laminate embodiment made up of: i) a polycarbonate substrate, ii) an overlay, and iii) a protective layer; useful materials and characteristic dimensions of the substrate and overlay layers are the same as in the two-layer composite laminate embodiments.

Although any kind of protective film can be used as a protective layer, non-limiting examples of useful protective layer materials include acrylic films. As a non-limiting example, of a commercially available polyvinyl fluoride (PVF) film that can be used as a protective layer is the commercially available product distributed by DuPont under the trademark TEDLAR. Based upon the desired visual and performance characteristics of the three-layer composite laminate, persons of ordinary skill in the art will be able to select useful protective layer materials without having to exercise undue experimentation.

The protective layer can have any thickness, and based upon the target application, persons of ordinary skill in the art will be able to select useful thicknesses without having to exercise undue experimentation. As a non-limiting example of useful protective-layer thicknesses, the protective layer can have a thickness ranging from about 0.05 to 1 mm.

Thin-sheet or film materials useful for manufacturing the protective layer can be purchased commercially. The thin-sheet or film protective-layer materials can also be manufactured from a resin formulation or commercially available sheet of material by using conventional methods that include direct film extrusion, blown film extrusion, sheet calendering, or combinations thereof.

This three-layer embodiment, which does not include an adhesive layer, can be manufactured using a process generally involving one or two steps. The one-step process binding or uniting all three layers in a single step by applying heat, pressure, or both to the stacked three layers over a period of time. And the two-step process involving a first step that binds or unites either the i) substrate and overlay layers or ii) overlay and protective layers to form an intermediate composite material, and the second step involves binding or uniting the intermediate composite material with the remaining third layer. Persons of ordinary skill in the art will be able to select useful heats, pressures, or both to be used in a one-step or two-step manufacturing process without having to exercise undue experimentation.

As a nonlimiting example, useful heats for bonding the substrate and overlay in this three-layer embodiment include heats ranging from about room temperature to 400° F.

As a non-limiting example of useful pressures for bonding this three-layer composite laminate layers, useful pressures can range from about 600 to 2000 pounds per square inch:

Useful combinations of heat and pressure that can be applied over a period of time include 5-10 hours under a temperature ranging from 200-400° F. in a pressure ranging from about 600-2000 pounds per square inch.

In order to apply heat and pressure over a period of time during the manufacture of a three-layer composite laminate. embodiment, non-limiting examples of useful manufacturing apparatuses include a film-calendering line, a thermal press, or a combination thereof.

FOUR-LAYER COMPOSITE LAMINATE

An additional embodiment provides for a protective fourth layer being added to the above-described three-layer composite embodiment that has an adhesive middle layer. The protective fourth layer is positioned on top of the overlay. In a four-layer composite laminate, the four respectively adjacent layers are positioned relative to one another as follows: i) a polycarbonate substrate; ii) an adhesive layer; an overlay; and iv) a protective layer.

With respect to a four-layer composite laminate embodiment, one-step manufacturing methods may or may not involve applying heat and pressure to the stacked four layers [i.e., i) substrate; ii) adhesive layer, iii) overlay, and iv) protective layer] over a period of time. Whether heat and pressure are used in manufacturing a four-layer composite laminate will depend on the performance and activation characteristics of the adhesive layer. If the adhesive layer is heat activated, then heat and pressure will need to be applied during the manufacturing process. But if the adhesive layer requires neither heat nor pressure for activation, then embodiments provide for only applying pressure to the composite structure during the manufacturing process. Embodiments provide for using at least pressure during the manufacturing process in order to bond the protective layer to the overlay. Persons of ordinary skill in the art will be able to determine, based on the type of adhesive or combination of adhesives forming the adhesive layer, whether pressure or both heat and pressure are required in order to bond or unite all four layers into a single composite structure. Furthermore, persons of ordinary skill in the art will be able to determine the necessary amount of pressure or both heat and pressure to be applied during the manufacturing process without having to exercise undue experimentation.

Alternate embodiments provide for manufacturing the four-layer composite laminate in more than one bonding step. Stated differently, additional manufacturing methods are available beyond manufacturing the four-layer composite laminate in a single bonding step that applies pressure; heat and pressure; or both to the four stacked layers. A four-layer composite-laminate manufacturing method that uses more than one bonding step, could include two, three, or more bonding steps. A non-limiting example of a two-step manufacturing method includes a first step of: bonding or uniting the i) substrate, ii)adhesive, and iii) overlay—to form a first composite structure; and a second step of bonding the first composite structure to the protective layer. Additionally, a non-limiting example of a three-step manufacturing method includes a first step of: bonding or uniting the substrate layer and adhesive layer to form a first intermediate composite structure; a second step of bonding or uniting the first composite structure's adhesive side to an overlay layer to form a second intermediate composite structure, and a third step of bonding or uniting the overlay layer of the second intermediate composite structure to a protective layer to form the four-layer composite laminate.

In manufacturing embodiments that bond or unite the four layers in one or more manufacturing steps; heat, pressure, or both can be applied to the respective layers over a period of time in order to create the four-layer composite laminate.

As a nonlimiting example, useful heats for bonding the layers of this four-layer embodiment include heats ranging from about room temperature to 400° F.

As a non-limiting example of useful pressures for bonding the layers of this four-layer composite laminate, useful pressures can range from about 600 to 2000 pounds per square inch:

Useful combinations of heat and pressure that can be applied over a period of time include 5-10 hours under a temperature ranging from 200-400° F. in a pressure ranging from about 600-2000 pounds per square inch.

In order to apply heat and pressure over a period of time during the manufacture of a four-layer composite laminate embodiment, non-limiting examples of useful manufacturing apparatuses include a film-calendering line, a thermal press, or a combination thereof.

In four-layer composite laminate manufacturing embodiments that bond or unite the four layers in two or more steps; heat, pressure, or both can be applied to the subject layers in each respective step and over a period of time, in order to create the four-layer composite laminate.

COMPOSITE LAMINATE PERFORMANCE CHARACTERISTICS

Embodiments provide for the composite-laminate embodiments being fully compliant with FSTH (Flammability, Smoke, Toxicity and heat release) requirements. A description of the requirements follows: Flammability: Embodiments provide for the composite laminate, having any number of layers-2-4, being compliant with FAR 25-853 (a)(1)(i) of 60-second vertical burn and FAR 25-853(a)(1)(ii) 12-second vertical burn. 60-second vertical burn requires that average burn length should not exceed 6 inch, average after flame time should not exceed 15 seconds and average after flame drip time should not exceed 3 second. 12-second vertical burn requires that average burn length should not exceed 8 inch, average after flame time should not exceed 15 seconds and average after flame drip time should not exceed 5 second The embodiments has average burn length of 2"-5" for 60-second and 2"-5" for 12-second burn without drips after flame. The composite laminate is self-extinguished within 15 second.

Specific optical smoke density is tested by NBS smoke chamber. The average peak smoke density within 4-minute should not exceed 200 regulated by FAR 25-853(d) and 150 regulated by airbus ABD0031/ATS1000. Embodiments provide for the composite laminate, having any number of layers-2-4, being compliant with FAR 25-853(d) and ABD0031/ATS1000 requirements on smoke. The average peak smoke density within 4 minutes is less than 150.

Toxicity of burning gas is extracted from NBS smoke chamber and measured by Draeger tube. The average concentration (in parts per million, ppm) of the following gas components in smoke should not exceed the limits within relevant test duration and required test conditions. HF<100 ppm, HCl<150 ppm, HCN<150 ppm, SO2/H2S<100 ppm, NO/NO2<100 ppm, CO<1000 ppm. Embodiments provide for the composite laminate, having any number of layers-2-4, being compliant with the internal toxicity requirements aforementioned from Airbus ABD0031/AITM 3.0005 and Boeing BSS/7239.

Heat release and heat release rate is measured by OSU heat release tester. The total 2-minute heat release (THR) and heat release rate (HRR) should not exceed 65 KW-min/m2 and 65 KW/m2, respectively regulated by FAR 25-853(d).: Embodiments provide for the composite laminate, having any number of layers-2-4, being compliant with FAR 25-853(d) on OSU 2-min total heat release (THR) and HRR (Peak heat release rate) within 5 minutes. The THR and HRR both meet 65/65 requirements.

There is no limitation directed to the possible uses for the composite laminate, and non-limiting examples of uses for the composite laminate include: interior ceiling panel, wall panel, partition, class divider, tray table, window shade, and seat. Persons of ordinary skill in the art will be able to determine uses for the composite laminate without having to exercise undue experimentation.

What is claimed is:

1. A multi-layer composite laminate composition comprising:
   a substrate layer and an overlay layer that are both bonded to at least one adjacent layer in a multi-layer composite laminate composition;
   the substrate layer being a thermoformable material having a material formulation that includes a polycarbonate homopolymer or copolymer;
   the overlay layer being a thermoformable material having a material formulation that includes an ingredient selected from the group consisting of PVC, PVC alloy, acrylic, polyurethane, acrylonitrile butadiene styrene, and combinations thereof;
   the multi-layer composite laminate composition having the following performance characteristics;
   flammability: the composite laminate being compliant with FAR 25-853(a)(1)(i)60-second vertical burn, wherein 60-second vertical burn average burn length does not exceed 6 inches, average after flame time does not exceed 15 seconds and average after flame drip time does not exceed 3 seconds;
   flammability: the composite laminate being compliant with FARQ25-853(a)(1)(ii) of 12-second vertical burn, wherein 12-second vertical burn average burn length does not exceed 8 inches, average after flame time does not exceed 15 seconds and average after-flame drip time does not exceed 5 seconds;
   specific optical smoke density: using an NBS smoke chamber, the average peak smoke density within 4-minute is equal to or less than 200 as regulated by FAR 25-853(d);
   specific optical smoke density: using an NBS smoke chamber, the average peak composite-material smoke density within 4-minute is equal to or less than 150 as regulated by airbus ABD0031/ATS1000;
   toxicity of burning gas: composite-material smoke extracted from NBS smoke chamber and measured by Draeger tube has an average concentration (in parts per million, ppm) of the following gas components: HF<100 ppm, HCl<150 ppm, HCN<150 ppm, SO2/H2S<100 ppm, NO/NO2<100 ppm, and CO<1000 ppm;
   heat release and heat release rate: as measured by OSU heat release tester, the total 2-minute heat release and heat release rate does not exceed 65KW-min/m2 and 65 KW/m2, respectively regulated by FAR 25-853(d);
   wherein the number of layers within the composition is two, the first layer being a substrate layer having a material formulation that includes a polycarbonate-polyester; and the second layer being an overlay layer having a material formulation that includes an ingredient selected from the group consisting of polyvinyl chloride, polyvinyl chloride alloy, acrylic, polyurethane, acrylonitrile butadiene styrene, and combinations thereof; and
   wherein the substrate layer has a material formulation comprising poly(oxycarbonyloxy-1,4-phenylene-isopropylidine) polycarbonate.

2. A multi-layer composite laminate composition comprising:
   a substrate layer and an overlay layer that are both bonded to at least one adjacent layer in a multi-layer composite laminate composition:
   the substrate layer being a thermoformable material having a material formulation that includes a polycarbonate homopolymer or copolymer;
   the overlay layer being a thermoformable material having a material formulation that includes an ingredient selected from the group consisting of PVC, PVC alloy, acrylic, polyurethane, acrylonitrile butadiene styrene, and combinations thereof;
the multi-layer composite laminate composition having the following performance characteristics;
flammability: the composite laminate being compliant with FAR 25-853(a)(1)(i)60-second vertical burn, wherein 60-second vertical burn average burn length does not exceed 6inches, average after flame time does not exceed 15 seconds and average after flame drip time does not exceed 3 seconds;
flammability: the composite laminate being compliant with FARQ025-853(a)(1)(ii) of 12-second vertical burn, wherein 12-second vertical burn average burn length does not exceed 8inches, average after flame time does not exceed 15 seconds and average after-flame drip time does not exceed 5 seconds;
specific optical smoke density: using an NBS smoke chamber, the average peak smoke density within 4-minute is equal to or less than 200 as regulated by FAR 25-853(d);
specific optical smoke density: using an NBS smoke chamber, the average peak composite-material smoke density within 4-minute is equal to or less than 150 as regulated by airbus ABD0031/ATS1000;
toxicity of burning gas: composite-material smoke extracted from NBS smoke chamber and measured by Draeger tube has an average concentration (in parts per million, ppm) of the following gas components: HF<100 ppm, HCI<150 ppm, HCN<150 ppm, SO2/H2S<100 ppm, NO/NO2<100 ppm, and CO<1000 ppm;
heat release and heat release rate: as measured by OSU heat release tester, the total 2-minute heat release and heat release rate does not exceed 65 KW-min/m2 and 65 KW/m2, respectively regulated by FAR 25-853(d);
wherein the number of layers within the composition is three, the first layer being a substrate layer having a material formulation that includes a polycarbonate-polyester: the second layer being an adhesive layer having a material formulation that includes an ingredient selected from the group consisting of acrylic adhesives, polyurethane adhesives, and combinations thereof: and the third layer being an overlay layer having a material formulation that includes an ingredient selected from the group consisting of polyvinyl chloride, polyvinyl chloride alloy, acrylic, polyurethane, acrylonitrile butadiene styrene, and combinations thereof: and
wherein the substrate layer has a material formulation comprising poly(oxycarbonyloxy-1,4-phenylene-isopropylidine) polycarbonate.

3. A multi-layer composite laminate composition comprising:
a substrate layer and an overlay layer that are both bonded to at least one adjacent layer in a multi-layer composite laminate composition;
the substrate layer being a thermoformable material having a material formulation that includes a polycarbonate homopolymer or copolymer;
the overlay layer being a thermoformable material having a material formulation that includes an ingredient selected from the group consisting of PVC, PVC alloy, acrylic, polyurethane, acrylonitrile butadiene styrene, and combinations thereof;
the multi-layer composite laminate composition having the following performance characteristics;
flammability: the composite laminate being compliant with FAR 25-853(a)(1)(i)60-second vertical burn, wherein 60-second vertical burn average burn length does not exceed 6 inches, average after flame time does not exceed 15 seconds and average after flame drip time does not exceed 3 seconds;
flammability: the composite laminate being compliant with FARQ25-853(a)(1)(ii) of 12-second vertical burn, wherein 12-second vertical burn average burn length does not exceed 8inches, average after flame time does not exceed 15 seconds and average after-flame drip time does not exceed 5 seconds;
specific optical smoke density: using an NBS smoke chamber, the average peak smoke density within 4-minute is equal to or less than 200 as regulated by FAR 25-853(d);
specific optical smoke density: using an NBS smoke chamber, the average peak composite-material smoke density within 4-minute is equal to or less than 150 as regulated by airbus ABD0031/ATS1000;
toxicity of burning gas: composite-material smoke extracted from NBS smoke chamber and measured by Dragger tube has an average concentration (in parts per million, ppm) of the following gas components: HF<100 ppm, HCI<150 ppm, HCN<150 ppm, SO2/H2S<100 ppm, NO/NO2<100 ppm, and CO<1000 ppm;
heat release and heat release rate; as measured by OSU heat release tester, the total 2-minute heat release and heat release rate does not exceed 65 KW-min/m2 and 65 KW/m2, respectively regulated by FAR 25-853(d);
wherein the number of layers within the composition is three, the first layer being a substrate layer having a material formulation that includes a polycarbonate-polyester; the second layer being an overlay layer having a material formulation that includes an ingredient selected from the group consisting of polyvinyl chloride, polyvinyl chloride alloy, acrylic, polyurethane, acrylonitrile butadiene styrene, and combinations thereof, and the third layer being a protective layer having a material formulation that includes an ingredient selected from the group consisting of acrylic, polyvinyl fluoride, or a combination thereof; and
wherein the substrate layer has a material formulation comprising poly(oxycarbonyloxy-1,4-phenylene-isopropylidine) polycarbonate.

4. A multi-layer composite laminate composition comprising:
a substrate layer and an overlay layer that are both bonded to at least one adjacent layer in a multi-layer composite laminate composition;
the substrate layer being a thermoformable material having a material formulation that includes a polycarbonate homopolymer or copolymer;
the overlay layer being a thermoformable material having a material formulation that includes an ingredient selected from the group consisting of PVC, PVC alloy, acrylic, polyurethane, acrylonitrile butadiene styrene, and combinations thereof;
the multi-layer composite laminate composition having the following performance characteristics;
flammability: the composite laminate being compliant with FAR 25-853(a)(1)(i)60-second vertical burn, wherein 60-second vertical burn average burn length does not exceed 6 inches, average after flame time does not exceed 15 seconds and average after flame drip time does not exceed 3 seconds;
flammability: the composite laminate being compliant with FARQ25-853(a)(1)(ii) of 12-second vertical burn, wherein 12-second vertical burn average burn length does not exceed 8 inches, average after flame time does not exceed 15 seconds and average after-flame drip time does not exceed 5 seconds;

specific optical smoke density: using an NBS smoke chamber, the average peak smoke density within 4-minute is equal to or less than 200 as regulated by FAR 25-853(d);

specific optical smoke density: using an NBS smoke chamber, the average peak composite-material smoke density within 4-minute is equal to or less than 150 as regulated by airbus ABD0031/ATS1000;

toxicity of burning gas: composite-material smoke extracted from NBS smoke chamber and measured by Draeger tube has an average concentration (in parts per million, ppm) of the following gas components: HF<100 ppm, HCI<150 ppm, HCN<150 ppm, SO2/H2S<100 ppm, NO/NO2<100 ppm, and CO<1000 ppm;

heat release and heat release rate: as measured by OSU heat release tester, the total 2-minute heat release and heat release rate does not exceed 65 KW-min/m2 and 65 KW/m2, respectively regulated by FAR 25-853(d);

wherein the number of layers within the composition is four, the first layer being a substrate layer having a material formulation that includes a polycarbonate-polyester; the second layer being an adhesive layer having a material formulation that includes an ingredient selected from the group consisting of acrylic adhesives, polyurethane adhesives, and combinations thereof; the third layer being an overlay layer having a material formulation that includes an ingredient selected from the group consisting of polyvinyl chloride, polyvinyl chloride alloy, acrylic, polyurethane, acrylonitrile butadiene styrene, and combinations thereof; the fourth layer being a protective layer having a material formulation that includes an ingredient selected from the group consisting of acrylic, polyvinyl fluoride, or a combination thereof; and wherein the substrate layer has a material formulation comprising poly(oxycarbonyloxy-1,4-phenylene-isopropylidine) polycarbonate.

5. A multi-layer composite laminate composition comprising:

a substrate layer and an overlay layer that are both bonded to at least one adjacent layer in a multi-layer composite laminate composition;

the substrate layer being a thermoformable material having a material formulation that includes a polycarbonate homopolymer or copolymer;

the overlay layer being a thermoformable material having a material formulation that includes an ingredient selected from the group consisting of PVC, PVC alloy acrylic, polyurethane, acrylonitrile butadiene styrene, and combinations thereof;

the multi-layer composite laminate composition having the following performance characteristics;

flammability: the composite laminate being compliant with FAR 25-853(a)(1)(i)60-second vertical burn, wherein 60-second vertical burn average burn length does not exceed 6 inches, average after flame time does not exceed 15 seconds and average after flame drip time does not exceed 3 seconds;

flammability: the composite laminate being compliant with FARQ25-853(a)(1)(ii) of 12-second vertical burn, wherein 12-second vertical burn average burn length does not exceed 8 inches, average after flame time does not exceed 15 seconds and average after-flame drip time does not exceed 5 seconds;

specific optical smoke density: using an NBS smoke chamber, the average peak smoke density within 4-minute is equal to or less than 200 as regulated by FAR 25-853(d);

specific optical smoke density: using an NBS smoke chamber, the average peak smoke composite-material smoke density within 4-minute is equal to or less than 150 as regulated by airbus ABD0031/ATS1000;

toxicity of burning gas: composite-material smoke extracted from NBS smoke chamber and measured by Draeger tube has an average concentration (in parts per million, ppm) of the following gas components: HF<100 ppm, HCI<150 ppm, HCN<150 ppm, SO2/H2S<100 ppm, NO/NO2<100 ppm, and CO<1000 ppm;

heat release and heat release rate: as measured by OSU heat release tester, the total 2-minute heat release and heat release rate does not exceed 65 KW-min/m2 and 65 KW/m2, respectively regulated by FAR 25-853(d);

wherein the number of layers within the composition is two, the first layer being a substrate layer having a material formulation that includes a polycarbonate-polyester; and the second layer being an overlay layer having a material formulation that includes an ingredient selected from the group consisting of polyvinyl chloride, polyvinyl chloride alloy, acrylic, polyurethane, acrylonitrile butadiene styrene, and combinations thereof; and wherein the substrate layer has a material formulation comprising poly(oxycarbonyloxy-1,4-phenylene-isopropylidine) polycarbonate and has a thickness ranging from about 0.5-6 mm; and the overlay layer has a thickness ranging from about 0.5-1.00 mm.

6. A multi-layer composite laminate composition comprising:

a substrate layer and an overlay layer that are both bonded to at least one adjacent layer in a multi-layer composite laminate composition;

the substrate layer being a thermoformable material having a material formulation that includes a polycarbonate homopolymer or copolymer;

the overlay layer being a thermoformable material having a material formulation that includes an ingredient selected from the group consisting of PVC, PVC alloy, acrylic, polyurethane, acrylonitrile butadiene styrene, and combinations thereof;

the multi-layer composite laminate composition having the following performance characteristics;

flammability: the composite laminate being compliant with FAR 25-853(a)(1)(i)60-second vertical burn, wherein 60-second vertical burn average burn length does not exceed 6 inches, average after flame time does not exceed 15 seconds and average after flame drip time does not exceed 3 seconds;

flammability: the composite laminate being compliant with FARQ25-853(a)(1)(ii) of 12-second vertical burn, wherein 12-second vertical burn average burn length does not exceed 8 inches, average after flame time does not exceed 15 seconds and average after-flame drip time does not exceed 5 seconds;

specific optical smoke density: using an NBS smoke chamber, the average peak smoke density within 4-minute is equal to or less than 200 as regulated by FAR 25-853(d);

specific optical smoke density: using an NBS smoke chamber, the average peak composite-material smoke density within 4-minute is equal to or less than 150 as regulated by airbus ABD0031/ATS1000;

toxicity of burning gas: composite-material smoke extracted from NBS smoke chamber and measured by Draeger tube has an average concentration (in parts per million, ppm) of the following gas components: HF<100 ppm, HCI<150 ppm, HCN<150 ppm, SO2/H2S<100 ppm, NO/NO2<100 ppm, and CO<1000 ppm;

heat release and heat release rate as measured by OSU heat release tester, the total 2-minute heat release and heat release rate does not exceed 65 KW-min/m2 and 65 KW/m2, respectively regulated by FAR 25-853(d);

wherein the number of layers within the composition is three, the first layer being a substrate layer having a material formulation that includes a polycarbonate-polyester; the second layer being an adhesive layer having a material formulation that includes an ingredient selected from the group consisting of acrylic adhesives, polyurethane adhesives, and combinations thereof; and the third layer being an overlay layer having a material formulation that includes an ingredient selected from the group consisting of polyvinyl chloride, polyvinyl chloride alloy, acrylic, polyurethane, acrylonitrile butadiene styrene, and combinations thereof; and wherein the substrate layer has a material formulation comprising poly(oxycarbonyloxy-1,4-phenylene-isopropylidine) polycarbonate and has a thickness ranging from about 0.5-6 mm; the adhesive layer has a thickness ranging from about 0.01 mm-0.2 mm; and the overlay layer has a thickness ranging from about 0.5-1.00 mm.

7. A multi-layer composite laminate composition comprising:
a substrate layer and an overlay layer that are both bonded to at least one adjacent layer in a multi-layer composite laminate composition;
  the substrate layer being, a thermoformable material having a material formulation that includes a polycarbonate homopolymer or copolymer;
  the overlay layer being a thermoformable material having a material formulation that includes an ingredient selected from the group consisting of PVC, PVC alloy, acrylic, polyurethane, acrylonitrile butadiene styrene, and combinations thereof;
  the multi-layer composite laminate composition having the following performance characteristics;
flammability: the composite laminate being compliant with FAR 25-853(a)(1)(i)60-second vertical burn, wherein 60-second vertical burn average burn length does not exceed 6 inches, average after flame time does not exceed 15 seconds and average after flame drip time does not exceed 3 seconds;
flammability: the composite laminate being compliant with FARQ25-853(a)(1)(ii) of 12-second vertical burn, wherein 12-second vertical burn average burn length does not exceed 8 inches, average after flame time does not exceed 15 seconds and average after-flame drip time does not exceed 5 seconds;
specific optical smoke density: using an NBS smoke chamber, the average peak smoke density within 4-minute is equal to or less than 200 as regulated by FAR 25-853(d);
specific optical smoke density: using an NBS smoke chamber, the average peak composite-material smoke density within 4-minute is equal to or less than 150 as regulated by airbus ABD0031/ATS1000;
toxicity of burning gas: composite-material smoke extracted from NBS smoke chamber and measured by Draeger tube has an average concentration (in parts per million, ppm) of the following gas components: HF<100 ppm, HCI<150 ppm, HCN<150 ppm, SO2/H2S<100 ppm, NO/NO2<100 ppm, and CO<1000 ppm;
heat release and heat release rate: as measured by OSU heat release tester, the total 2-minute heat release and heat release rate does not exceed 65 KW-min/m2 and 65 KW/m2, respectively regulated by FAR 25-853(d);
wherein the number of layers within the composition is three, the first layer being a substrate layer having a material formulation that includes a polycarbonate-polyester: the second layer being an overlay layer having a material formulation that includes an ingredient selected from the group consisting of polyvinyl chloride, polyvinyl chloride alloy, acrylic, polyurethane, acrylonitrile butadiene styrene, and combinations thereof, and the third layer being a protective layer having a material formulation that includes an ingredient selected from the group consisting of acrylic, polyvinyl fluoride, or a combination thereof; and
wherein the substrate layer has a material formulation comprising poly(oxycarbonyloxy-1,4-phenylene-isopropylidine) polycarbonate and has a thickness ranging from about 0.5-6 mm;
the overlay layer has a thickness ranging from about 0.5-1.00 mm; and the protective layer has a thickness ranging from about 0.05 to 1 mm.

8. A multi-layer composite laminate composition comprising:
a substrate layer and an overlay layer that are both bonded to at least one adjacent layer in a multi-layer composite laminate composition;
  the substrate layer being a thermoformable material having a material formulation that includes a polycarbonate homopolymer or copolymer;
  the overlay layer being a thermoformable material having a material formulation that includes an ingredient selected from the group consisting of PVC, PVC alloy, acrylic, polyurethane, acrylonitrile butadiene styrene, and combinations thereof;
  the multi-layer composite laminate composition having the following performance characteristics;
flammability: the composite laminate being compliant with FAR 25-853(a)(1)(i)60-second vertical burn, wherein 60-second vertical burn average burn length does not exceed 6 inches, average after flame time does not exceed 15 seconds and average after flame drip time does not exceed 3 seconds;
flammability: the composite laminate being compliant with FARQ025-853(a)(1)(ii) of 12-second vertical burn, wherein 12-second vertical burn average burn length does not exceed 8 inches, average after flame time does not exceed 15 seconds and average after-flame drip time does not exceed 5 seconds;
specific optical smoke density: using an NBS smoke chamber, the average peak smoke density within 4-minute is equal to or less than 200 as regulated by FAR 25-853(d);
specific optical smoke density: using an NBS smoke chamber, the average peak composite-material smoke density within 4-minute is equal to or less than 150 as regulated by airbus ABD0031/ATS1000;
toxicity of burning gas: composite-material smoke extracted from NBS smoke chamber and measured by Draeger tube has an average concentration (in parts per million, ppm) of the following gas components: HF<100 ppm, HCI<150 ppm, HCN<150 ppm, SO2/H2S<100 ppm, NO/NO2<100 ppm, and CO<1000 ppm;
heat release and heat release rate; as measured by OSU heat release tester, the total 2-minute heat release and heat release rate does not exceed 65 KW-min/m2 and 65 KW/m2, respectively regulated by FAR 25-853(d);
wherein the number of layers within the composition is four, the first layer being a substrate layer having a material formulation that includes a polycarbonate-polyester; the second layer being an adhesive layer having a material formulation that includes an ingredient selected from the group consisting of acrylic adhesives, polyurethane adhesives, and combinations thereof; the third layer being an overlay layer having a material formulation that includes an ingredient selected from the group consisting of polyvinyl chloride, polyvinyl chloride alloy, acrylic, polyurethane, acrylonitrile butadiene styrene, and combinations thereof; the fourth layer being a protective layer having a material formulation that includes an ingredient selected from the group consisting of acrylic, polyvinyl fluoride, or a combination thereof; and wherein the substrate layer has a material formulation comprising poly(oxycarbonyloxy-1,4-phenylene-isopropylidine) polycarbonate and has a thickness ranging from about 0.5-6 mm;

the adhesive layer has a thickness ranging from about 0.01 mm-0.2 mm; and the overlay layer has a thickness ranging from about 0.5-1.00 mm; and the protective layer has a thickness ranging from about 0.05 to 1 mm.

9. A multi-layer composite laminate composition comprising:

a substrate layer and an overlay layer that are both bonded to at least one adjacent layer in a multi-layer composite laminate composition;

the substrate layer being a thermoformable material having a material formulation that includes poly(oxycarbonyloxy-1,4-phenylene-isopropylidine) polycarbonate;

the overlay layer being a thermoformable material having a material formulation that includes an ingredient selected from the group consisting of PVC, PVC alloy, acrylic, polyurethane, acrylonitrile butadiene styrene, and combinations thereof;

the multi-layer composite laminate composition having the following performance characteristics;

flammability: the composite laminate being compliant with FAR 25-853(a)(1)(i)60-second vertical burn, wherein 60-second vertical burn average burn length does not exceed 6 inches, average after flame time does not exceed 15 seconds and average after flame drip time does not exceed 3 seconds;

flammability: the composite laminate being compliant with FAR 25-853(a)(1)(ii) of 12-second vertical burn, wherein 12-second vertical burn average burn length does not exceed 8 inches, average after flame time does not exceed 15 seconds and average after-flame drip time does not exceed 5 seconds;

specific optical smoke density: using an NBS smoke chamber, the average peak smoke density within 4-minute is equal to or less than 200 as regulated by FAR 25-853(d);

specific optical smoke density: using an NBS smoke chamber, the average peak composite-material smoke density within 4-minute is equal to or less than 150 as regulated by airbus ABD0031/ATS1000;

toxicity of burning gas: composite-material smoke extracted from NBS smoke chamber and measured by Draeger tube has an average concentration (in parts per million, ppm) of the following gas components: HF<100 ppm, HCl<150 ppm, HCN<150 ppm, SO2/H2S<100 ppm, NO/NO2<100 ppm, and CO<1000 pppm;

heat release and heat release rate: as measured by OSU heat release tester, the total 2-minute heat release and heat release rate does not exceed 65 KW-min/m2 and 65 KW/m2, respectively regulated by FAR 25-853(d).

10. A multi-layer composite laminate composition comprising:

a substrate layer and an overlay layer that are both bonded to at least one adjacent layer in a multi-layer composite laminate composition;

the substrate layer being a thermoformable material having a material formulation that includes poly(oxycarbonyloxy-1,4-phenylene-isopropylidine) polycarbonate, the substrate layer having a thickness ranging from about 0.5-6 mm;

the overlay layer being a thermoformable material having a material formulation that includes an ingredient selected from the group consisting of PVC, PVC alloy, acrylic, polyurethane, acrylonitrile butadiene styrene, and combinations thereof;

the overlay layer having a thickness ranging from about 0.5-1.00 mm;

the multi-layer composite laminate composition having the following performance characteristics:

flammability: the composite laminate being compliant with FAR 25-853(a)(1)(i)60-second vertical burn, wherein 60-second vertical burn average burn length does not exceed 6 inches, average after flame time does not exceed 15 seconds and average after flame drip time does not exceed 3 seconds;

flammability: the composite laminate being compliant with FAR 25-853(a)(1)(ii) of 12-second vertical burn, wherein 12-second vertical burn average burn length does not exceed 8 inches, average after flame time does not exceed 15 seconds and average after-flame drip time does not exceed 5 seconds;

specific optical smoke density: using an NBS smoke chamber, the average peak smoke density within 4-minute is equal to or less than 200 as regulated by FAR 25-853(d);

specific optical smoke density: using an NBS smoke chamber, the average peak composite-material smoke density within 4-minute is equal to or less than 150 as regulated by airbus ABD0031/ATS1000;

toxicity of burning gas: composite-material smoke extracted from NBS smoke chamber and measured by Draeger tube has an average concentration (in parts per million, ppm) of the following gas components: HF<100 ppm, HCl<150 ppm, HCN<150 ppm, SO2/H2S<100 ppm, NO/NO2<100 ppm, and CO<1000 ppm;

heat release and heat release rate: as measured by OSU heat release tester, the total 2-minute heat release and heat release rate does not exceed 65 KW-min/m2 and 65 KW/m2, respectively regulated by FAR 25-853(d).

* * * * *